Sept. 10, 1940.  G. H REID  2,214,538
GYROSCOPIC INSTRUMENT
Filed Jan. 6, 1940   2 Sheets-Sheet 1

Inventor
George Hancock Reid
By Stevens & Davis
Attorneys

Sept. 10, 1940.   G. H. REID   2,214,538
GYROSCOPIC INSTRUMENT
Filed Jan. 6, 1940   2 Sheets-Sheet 2
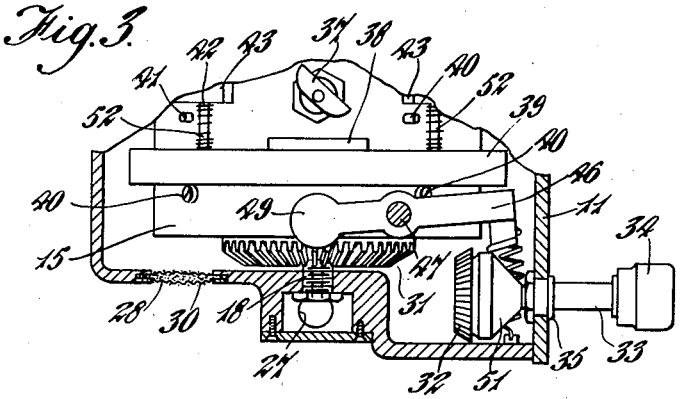
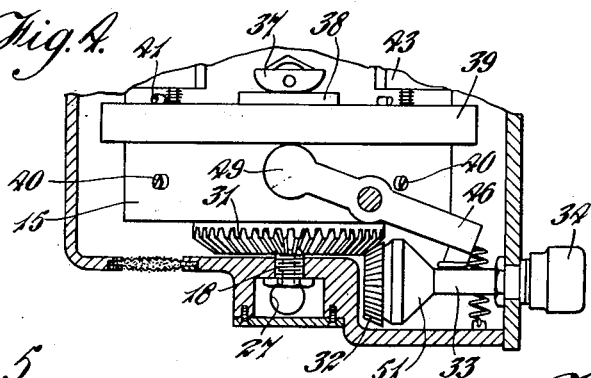
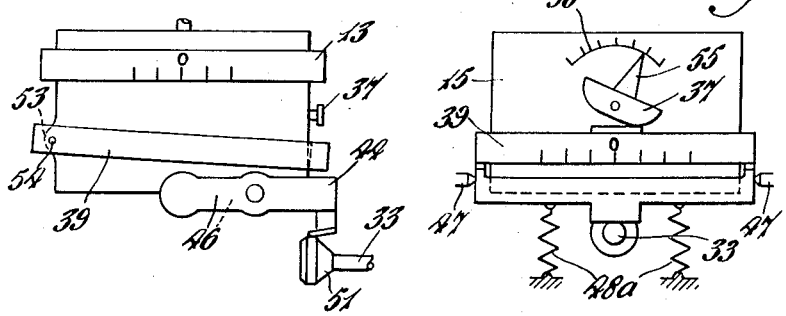
Inventor
George Hancock Reid
By Stevens & Davis
Attorneys Patented Sept. 10, 1940

2,214,538

UNITED STATES PATENT OFFICE 2,214,538

GYROSCOPIC INSTRUMENT

George Hancock Reid, Hampstead, London, England

Application January 6, 1940, Serial No. 312,700
In Great Britain November 9, 1938

12 Claims. (Cl. 74—5)

This invention relates to gyroscopic instruments, particularly such as are used in aircraft or other vehicles, and of the kind involving the use of a free gyro. Such instruments are used for indicating direction and maybe also attitude of the carrying vehicle, and it is desirable to provide simple means which will enable the gyro to be re-set from time to time. When it is required to rotate the gyro system in azimuth it is further desirable to hold the gyro and inner gimbal. The present invention seeks to provide means for re-setting free gyro instruments whilst precluding the possibility of excessive force being applied, the setting means being of a simple and reliable order. The means provided by the present invention may also enable the instrument, being normally a free gyro instrument, to be used on occasion as a restrained gyro instrument for indicating sense of turn and giving some (though maybe not an accurate) indication of rate of turn.

The invention is illustrated in the accompanying drawings, in which:

Figure 3 is a fragmentary sectional side elevation of the lower part of the instrument, the latter being in its operative position;

Figure 4 is a view corresponding to Figure 3 but with the setting and caging mechanism not in use;

Figure 5 is a fragmentary side elevation drawn diagrammatically to illustrate a modified form of construction; and Figure 6 is a diagrammatic front view of a further modified instrument adapted to be operated as a "rate of turn" indicator.

Figure 1:
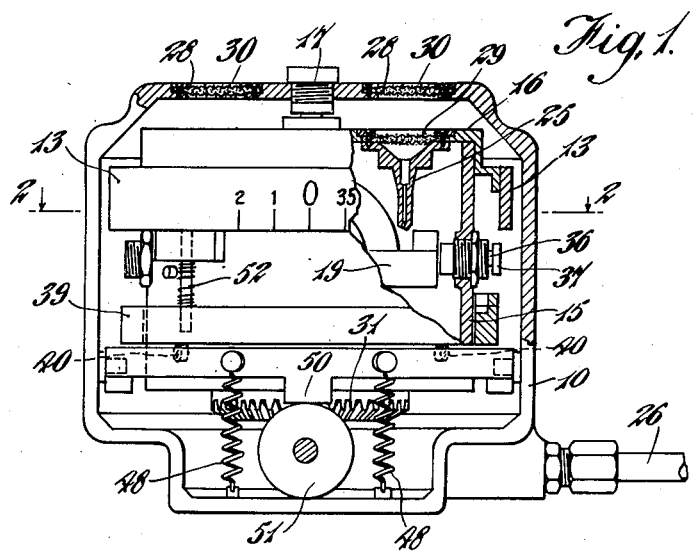
Figure 1 is a front elevation of the preferred form of instrument shown partly in section and with the front removed.
Figure 2:
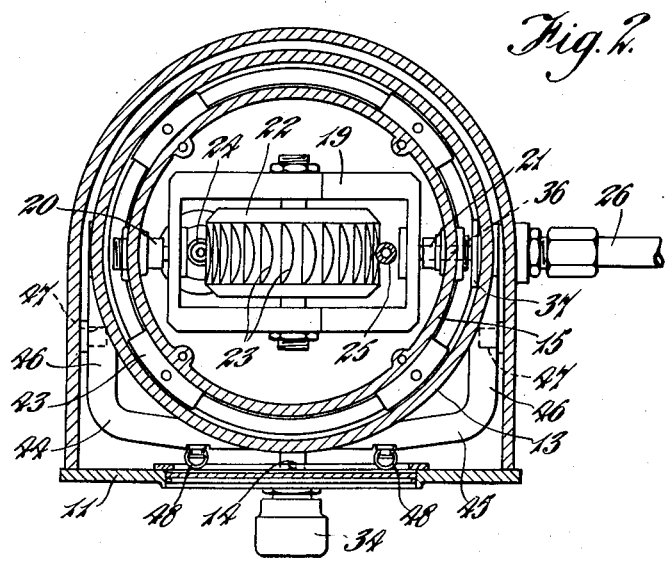
Figure 2 is a sectional plan taken on the line 2—2 of Figure 1.

The instrument shown in Figures 1 to 4 is a gyroscopic direction indicator intended primarily for use on aircraft, although of course it is equally applicable for various other forms of craft or vehicles. It comprises an outer casing 10 having in its front 11 a window 12 through which the angular position of a circular scale 13 can be viewed with reference to a vertical wire 14 acting as a lubber line. An outer gimbal 15 in the form of a substantially cylindrical container has a lid 16 which is flanged to carry the scale 13, said outer gimbal 15 being freely pivoted in an upper bearing 17 and a lower bearing 18 (see Figure 3), so that it is capable of rotating about its vertical axis relative to the casing 10. A rectangular frame 19 constituting an inner gimbal is mounted within the outer gimbal 15 in bearings 20 and 21 carried by said outer gimbal so as to permit free rocking movement of the inner gimbal about its horizontally disposed longitudinal axis. A rotor 22 is pivotally mounted in the customary manner within the inner gimbal 19, the axis of said rotor being disposed at right angles to the axis of the bearings 20 and 21. The rotor 22 is driven pneumatically and for this purpose its outer curved surface is bladed by the provision of crescent-shaped recesses 23, against the interior of which two streams of air are directed from nozzles 24 and 25, the necessary air current being produced by reducing the atmospheric pressure inside the outer gimbal 15. This is effected by joining to a Pitot head or venturi (not shown) a pipe 26 which leads to the interior of the outer gimbal 15 by way of a conduit 27 in the casing 10 and a passage provided through the lower bearing 18 of the said outer gimbal. Air from the surrounding atmosphere is accordingly drawn in through openings 28 in the outer casing 10 incorporating combined wire gauze and felt filters 30 and thence passes through nozzles 24 and 25 incorporating wire gauze filters, one of which is indicated at 29. With this arrangement, therefore, the atmospheric air is twice filtered before it reaches the rotor 22, thus maintaining the instrument in a clean condition for long periods.

For the purpose of locking and adjusting the outer gimbal 15 in an angular sense about its vertical pivotal axis, an annular member 31 formed with a circular series of bevel gear teeth is secured to the bottom of the said outer gimbal and is adapted to be engaged by a bevel pinion 32 fitted non-rotatably upon a spindle 33 having a knob 34 projecting from the front of the instrument. The spindle 33 is axially slidable through a bush 35 in the casing front 11 and is thus able to be slid from the inoperative position shown in Figure 3 to the setting position shown in Figure 4. When the outer gimbal 15 is being rotationally adjusted in this way it is desirable that the inner gimbal 19 should be caged, i. e. should be constrained against moving angularly about its horizontal pivotal axis on account of the precessional force developed when the rotor 22 is revolving. The inner gimbal 19 is therefore provided at one end with a spindle 36, which extends to the outside of the outer gimbal 15 and is fitted with a somewhat boat-shaped cam member 37, which will be seen more clearly in Figures 3 and 4.

It should be mentioned that the rocking movement of the inner gimbal 19 is limited by the nozzles 24 and 25 to an angle of slightly less than 180°. On this account the curved surface of the cam member 37 is always directed downwardly and it is adapted to be engaged by a plate 38 attached to a ring member 39 surrounding the outer gimbal 15 in such a manner as to be freely slidable thereon in an axial direction. This sliding movement is limited in a downward direction by a series of screws 40 and in an upward direction by a corresponding series of radial pins 41, the ring member 39 being urged normally into contact with the screws 40 by a series of fine wire compression springs 42, the upper ends of which engage blocks 43 fixed to the outside of the outer gimbal 15. When the ring member 39 is in this lower position it is completely free from the cam member 37, as will be seen in Figure 3.

A substantially U-shaped double lever 44 (see Figure 2) comprising a "base" portion 45 and a pair of arms 46 is pivoted to the casing 10 at positions intermediate the ends of the arms 46, as indicated at 47. The "base" portion 45 is urged downwards by coiled tension springs 48 connecting it with the bottom of the casing 10 and the outer free ends of the arms 46 are provided with rounded portions 49 adapted to engage and lift the ring member 39 when the coiled tension springs 48 are free to contract. This, however, is normally prevented when the instrument is in operation owing to the provision upon the "base" portion 45, of a follower lug 50 which is engaged by a somewhat conical cam member 51 freely rotatable but axially located upon the spindle 33. This normally lifts the said "base" portion 45 to the raised position shown in Figure 3 where the arms 46 are entirely free of the ring member 39, thus permitting unimpeded relative movement between the casing 10 and the outer gimbal 15. When, however, the knob 34 is pushed inwards for locking and setting the outer gimbal 15, the tension springs 48 are then free to deflect the U-shaped lever so that the rounded parts 49 bear upon substantially diametrically opposite portions of the ring member 39, thus lifting the latter against the action of the weak springs 42 and urging the cam member 37 to its centralised position as shown in Figure 4. As the knob 34 is turned to set the outer gimbal 15, the ring member 39 slides against the U-shaped lever, rotation of said ring member relative to the outer gimbal 15 being prevented by pins 52, which slide within the blocks 43. It will be seen that with this arrangement the force which can be applied to the cam member 37 is limited by the strength of the tension springs 48 so that the mounting of the inner gimbal 19 cannot be damaged by clumsy use of the knob 34, while in the event of the force due to precession exceeding a predetermined value, it is possible for the inner gimbal 19 to turn and depress the ring member 39 by overcoming the force of the tension springs 48. The bevel pinion 32 and cam member 51 are arranged so that when the desired setting has been accomplished, withdrawal of the knob 34 first disengages the pinion 32 from the outer gimbal 15 and subsequently releases the ring member 39 from the cam member 37 so that the rotor 22 is left spinning upon a truly horizontal axis, assuming, of course, that the casing 10 is disposed with the axis of the outer gimbal truly vertical.

A modified method of mounting the ring member 39 is shown in Figure 5, where the outer gimbal 15 is constructed and pivoted substantially as before, but is provided adjacent one side with a lug 53 adapted to receive a substantially tangential pivot pin 54 carried by said ring member 39. The lug 53 is disposed diametrically opposite to the cam member 37 of the inner gimbal so that one or other of the arms 46 of the lever 44 serves to raise the ring member 39 into engagement with the cam member 37, whatever the angular position of the outer gimbal 15 happens to be. Suitable stop means (not shown) should of course be provided to limit the movement of the ring member 39, and the lowermost part of the latter should rest at a level slightly above the arms 46 to avoid fouling these as the outer gimbal 15 rotates upon its axis.

With little adaptation the construction of direction indicating instrument above described is capable of being utilised to show "rate of turn" and a convenient method of obtaining this result is indicated diagrammatically in Figure 6. A U-shaped lever 44 is provided as before on pivots indicated at 47, and its two free extremities are adapted to co-operate with a ring member 39 which is axially slidable upon the outer gimbal 15. Instead of using strong tension springs, however, a pair of relatively weak tension springs 48a are used in conjunction with the lever 44 to urge the ring member 39 in an upward direction, while the cam member 37 carries a pointer 55 which reads against a convenient scale 56 upon the outer gimbal 15. For this adaptation it is necessary to lock the outer gimbal 15 against rotational movement and this can be effected through the medium of the previously described bevel pinion 32 and member 31. Frictional or other clamping means (not shown) can be provided to prevent rotation of the spindle 33. Thus although the modified instrument can be used as before, as a direction indicator, it can be brought into operation as a "rate of turn" indicator by setting and locking the outer gimbal in a predetermined position to bring the pointer 55 and scale 56 into register with an appropriate window (not shown) in the outer casing. With the gyro rotor spinning, any tendency of the outer case of the instrument to turn about a vertical axis causes the inner gimbal 19 to cant over due to precession and the cam member 37 thus depresses the ring member 39 against the action of the weak tension springs 48a, the extent of movement being dependent upon the rapidity with which the turn is made. In the form described the rate of turn indicator is not regarded as a precision instrument, owing to the frictional losses which are no doubt involved in the movement of the parts, but the additional pointer 55 fits in very well with the details of the direction indicator previously described and would add to the utility of the instrument. As indicated in Figure 6, the ring member 39 is provided with markings enabling it to serve in place of the scale ring 13 shown in Figure 1.

It will be appreciated that the devices described are given merely as examples of the manner in which the invention can be carried into effect and that various modifications are possible.

What I claim is:

1. A gyroscopic direction indicating instrument comprising in combination a casing, an outer gimbal mounted therein to rotate about a vertical axis, an inner gimbal mounted within said outer gimbal so as to rock about a horizontal axis, a driven gyro rotor carried by the said inner gimbal, a caging ring mounted upon the outer gimbal coaxially with the vertical pivotal axis thereof, means exterior of said outer gimbal operatively connected to said inner gimbal and adapted to be rotated by vertical movement of said ring to bring the inner gimbal to a predetermined caged position, a lever mounted within the casing below said ring, resilient means urging said lever into engagement with the ring to cause the latter to effect caging of the inner gimbal, and a manually releasable stop device arranged to hold the lever out of engagement with the ring when the instrument is in use.

2. In a gyroscopic direction indicating instrument having a casing, an outer gimbal mounted therein for rotation about a vertical axis, an inner gimbal disposed within the outer gimbal and pivoted to move angularly therewithin about a horizontal axis and a rotor mounted in the inner gimbal, the provision of caging means comprising in combination a ring slidably mounted on the outer gimbal and substantially coaxial therewith, manually operable mechanism carried by the casing and adapted to raise said ring, and a cam operatively connected with the inner gimbal, which cam is disposed outside the outer gimbal and is shaped so that when engaged by the ring it brings said inner gimbal to a predetermined caged position relative to the outer gimbal.

3. A gyroscopic direction indicating instrument comprising a casing, an outer gimbal which is mounted therewithin for rotation with respect thereto and is in the form of a substantially closed cylindrical casing, an inner gimbal mounted for rotation within said outer gimbal, a rotor mounted upon said inner gimbal so as to have three degrees of freedom relative to the casing, a manually operable mechanism carried by the outer casing, centralizing means upon the inner gimbal for bringing the latter to a centralized position, and a ring which is axially slidable upon the outside of the outer gimbal to contact with and operate said centralizing means and is engageable by the manually operable mechanism to be thereby brought into cooperative contact with said centralizing means and thereby centralize the inner gimbal irrespective of the angular disposition of the outer gimbal relative to the casing, said ring being spring urged to a position in which it permits the inner and outer gimbals to move freely on their respective pivotal axes.

4. A gyroscopic direction indicating instrument comprising in combination a casing, an outer gimbal mounted therein to rotate about a vertical axis, an inner gimbal mounted within said outer gimbal so as to rock about a horizontal axis, a driven gyro rotor carried by said inner gimbal, a caging ring mounted upon the outer gimbal coaxially with the vertical pivotal axis thereof, means whereby vertical movement of said ring brings the inner gimbal to a predetermined caged position, a U-shaped double lever extending around the outer gimbal and pivoted to the casing about an axis intersecting both limbs of the lever whereby the free ends of said limbs are caused to engage the ring and lift the latter to bring about the caging of the inner gimbal, resilient means urging said lever into engagement with the ring to effect the caging of the inner gimbal, and a manually releasable stop device arranged to engage the central part of the U-shaped double lever and hold the latter out of engagement with the ring when the instrument is in use.

5. A gyroscopic direction indicating instrument according to claim 4, in which the free ends of the U-shaped double lever engage the ring at substantially diametrically opposite positions.

6. A gyroscopic direction indicating instrument comprising in combination a casing, an outer gimbal mounted therein to rotate about a vertical axis, an inner gimbal mounted within said outer gimbal so as to rock about a horizontal axis, a driven gyro rotor carried by said inner gimbal, a caging ring mounted upon the outer gimbal coaxially with the vertical pivotal axis thereof, a member exterior of said outer gimbal carried by the inner gimbal whereby it is engaged by said ring to cage the latter as said ring is moved toward the mounting axis of said inner gimbal, and manually operable mechanism for actuating the ring on the outer gimbal, said mechanism comprising a U-shape double lever which extends around the outer gimbal and is pivotally mounted in said casing upon an axis intersecting both limbs of the lever, a tension spring connecting the central part of the U-shape double lever with the casing so as to urge the free ends thereof into engagement with the ring, and a manually operable cam device engaging said lever to oppose the action of the tension spring, but which when shifted to an inoperative position permits said spring to effect the caging of the inner gimbal.

7. A gyroscopic direction indicating instrument having a casing, an outer gimbal mounted therein for rotation about a vertical axis, an inner gimbal disposed within the outer gimbal and pivoted to move angularly therewithin about a horizontal axis, a rotor mounted within the inner gimbal, and caging means for the inner gimbal, said caging means comprising a vertical displaceable ring rotatable with the outer gimbal, manually operable mechanism carried by the casing and adapted to raise said ring, a cam operatively connected with the inner gimbal, which cam is disposed outside the outer gimbal and is shaped so that when engaged with the ring it brings said inner gimbal to a predetermined caged position relative to the outer gimbal, means for resiliently urging the ring into engagement with the cam, and indicating means provided in conjunction with the inner gimbal so as to operate when the casing and the outer gimbal are together turned about a vertical axis, said indicating means thus serving to show "rate of turn."

8. A gyroscopic direction indicating instrument according to claim 7, in which said manually operable mechanism is provided with a driving element adapted to engage a driven element on said outer gimbal whereby said outer gimbal may be locked relative to the outer casing or set by rotation thereof, for use as a direction indicator, by means of said manually operable mechanism.

9. A gyroscopic direction indicating instrument according to claim 1, including means for setting the outer gimbal relative to the casing, said means comprising a bevel pinion which is carried by a manually operable axially movable spindle, and is adapted to be brought into engagement with an annular row of bevel gear teeth upon the bottom of the outer gimbal.

10. In a gyroscopic direction indicating instrument comprising a casing, a substantially closed cylindrical outer gimbal mounted therein to rotate about a vertical axis, an inner gimbal mounted within said outer gimbal so as to rock about a horizontal axis and a driven gyro rotor carried by said inner gimbal, the provision of caging means for the inner gimbal and rotor, comprising a ring which is carried by the outer gimbal so as to lie substantially coaxial with the mounting axis of said outer gimbal, said ring being pivoted to the outer gimbal about an axis substantially tangential to said outer gimbal, manually operable mechanism mounted upon the casing, and a member exterior of said outer gimbal and operatively connected with the inner gimbal to move therewith at a position remote from the said tangential axis, said ring being movable in a direction towards and away from the mounting axis of the inner gimbal and being engageable on the one hand by the manually operable mechanism, and on the other hand with a member carried by the inner gimbal.

11. A gyroscopic direction indicating instrument according to claim 10 in which the member operatively connected with the inner gimbal comprises a cam disposed outside the outer gimbal and arranged to be engaged by that part of the ring remote from the tangential axis, for caging the inner gimbal.

12. A gyroscopic direction indicating instrument comprising in combination a casing, an outer gimbal mounted therein to rotate about an axis, an inner gimbal pivotally mounted within said outer gimbal to rock about an axis at right angles to the axis of said outer gimbal, a driven gyro rotor mounted for rotation in said inner gimbal, a caging ring about and coaxial with said outer gimbal, means exterior of said outer gimbal operatively connected to said inner gimbal adapted to be rotated by movement of said ring parallel to the axis of said outer gimbal whereby said means are engaged by said ring to bring the inner gimbal to a predetermined caged position, a lever pivotally mounted within said casing and adapted to contact with and move said ring in a direction parallel to the axis of said outer gimbal, resilient means urging said lever into engagement with said ring tending to cause the latter to effect the caging of the inner gimbal, and a manually releasable stop device arranged to hold the lever out of engagement with the ring when the instrument is in use.

GEORGE HANCOCK REID.